May 18, 1948.　　　A. J. LOCKREY ET AL　　　2,441,919
INTERMITTENT MOVEMENT CARRIAGE APPARATUS
FOR TESTING PHOTOGRAPHIC EXPOSURE
Filed Jan. 26, 1946
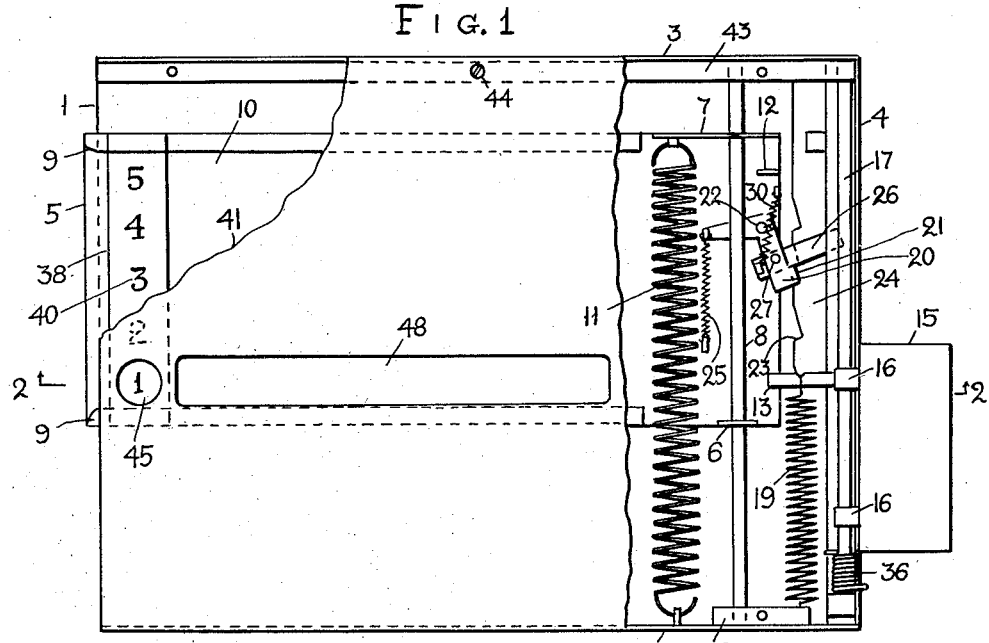
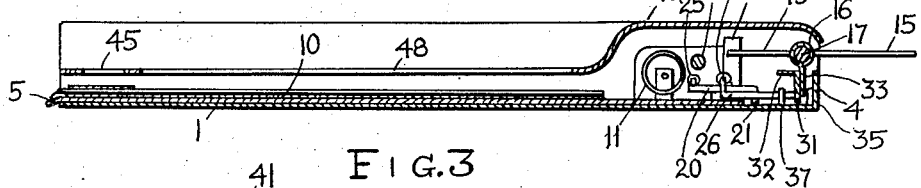
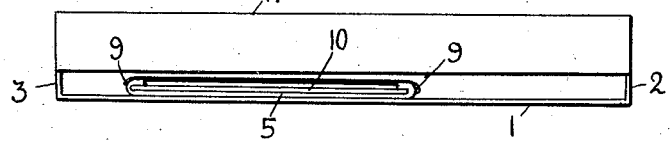
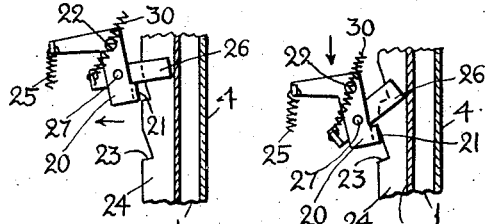
ANDREW J. LOCKREY
MORRIS DICHTER
INVENTOR
BY John P. Wilson
ATTORNEY Patented May 18, 1948

2,441,919

UNITED STATES PATENT OFFICE 2,441,919

INTERMITTENT MOVEMENT CARRIAGE APPARATUS FOR TESTING PHOTOGRAPHIC EXPOSURE

Andrew J. Lockrey, Flushing, and Morris Dichter, Brooklyn, N. Y.

Application January 26, 1946, Serial No. 643,614

5 Claims. (Cl. 95—10)

My invention relates to apparatus for testing photographic exposure, and has particular reference to apparatus for testing photographic papers for the time of exposure.

My invention has for its object to provide an apparatus of the type indicated above which can be used for rapid and reliable experimental determination of the time of exposure required for a particular photographic paper to reproduce an image projected on the paper from a particular negative.

Another object of my invention is to provide an apparatus which can be used for quickly and reliably determining the best grade of paper for a particular negative.

An allied object of my invention is to produce an apparatus in which both tests can be carried rapidly and simultaneously, i. e., determination of the best time of exposure for a particular negative, and of the best grade of photographic paper for properly reproducing the light and dark portions of the picture.

Still another object of my invention is to produce an apparatus as described above which will be small and inexpensive, can be portable and can be conveniently used for the rapid conduction of the above outlined tests.

The foregoing and other objects, features and advantages of my invention are more fully described in the accompanying specification and drawings in which:

Fig. 1 is a top plan view of my device with the cover partly in section;

Fig. 2 is a sectional view taken on the line 2—2 of Fig. 1;

Fig. 3 is a rear view of the device;

Fig. 4 is a detail view showing the pawl of the carriage at the moment of its release from a stationary rack;

Fig. 5 is a similar view of the pawl when the released carriage began to move.

My device for testing photographic exposure comprises a base 1, preferably made of sheet metal or other suitable sheet material, having upright side walls 2 and 3 and an end or front wall 4. A carriage 5, also made of sheet metal or similar material, is placed on the base and is provided with upstanding flanges 6, 7 at the front end with holes slidably engaging a guiding rod 8 secured at the ends in the side walls 2, 3. The carriage 5 has turned-over side edges 9 for receiving a strip 10 cut out of a photographic paper which it is desired to test for exposure. The carriage can slide over the base from one side wall to the other. A spring 11 is attached at one end to the wall 2 and at the other end to the flange 7, urging the carriage toward the wall 2. For moving the carriage, it is provided with an upstanding lug 12 which can be engaged by a finger 13 extending from a slide 15. The latter is provided with ring-shaped bearings 16 slidably mounted on a rod 17 secured at the ends in the walls 2, 3. A spring 19 is connected at one end to the wall 2 and at the other end to the finger 13, urging the slide toward the wall 2.

The carriage is provided with a pawl 20 pivotally connected therewith at 22 and having a depending tooth 21 adapted to engage teeth 23 of a rack 24 secured to the base 1 at the front end. A spring 25 urges the pawl into the engagement with the rack 24. The pawl engages the last tooth of the rack when moved outward by the slide 15. For releasing the carriage, a lever 26 is provided, pivotally connected to the pawl at 27 and normally resting against the pawl tooth 21, being urged thereto by a spring 30. The lever engages at its end a depending flange 31 of a bar 32 attached to lugs 33 extending from the rod 17, as shown more clearly in Fig. 2. The flange 31 normally engages a stop 35, being urged thereto as a result of a torque applied to the rod 17 by a torsion spring 36, one end of which rests on the bar 32 and the other end rests on the edge of the front wall 4. By depressing the slide 15, the flange 31 is turned outward until stopped by a second stop 37. By this movement of the flange 31, the lever 26 is moved outwards, causing the tooth 21 of the pawl 20 to be disengaged from the tooth 23 of the rack 24 as shown in Fig. 4. The now released carriage 5 will be pulled inward by the spring 11. This movement of the carriage will cause rotation of the lever 26 on its pivot 27 as shown in Fig. 5, allowing the pawl 20 to be pulled by the spring 25 into engagement with the next tooth 23. It follows therefor that the depression of the slide 15 will cause the carriage to be moved a single step, from one tooth 23 to the next, also that the movement will be completed by the depression of the slide, and the subsequent release of the slide will not affect the position of the carriage. This is very important in order to obtain a prompt movement of the photographic paper 10 from one position to the next, without any delays in this movement which might otherwise cause a blur on the image printed on the paper.

The spacing between the teeth 23 is so arranged that the strip 10 of the photographic paper is successively placed in a corresponding number of positions. A strip 38 of a transparent material is secured at the ends to the edges 9 above the strip 10 and is provided with numbers marked thereon. These numbers are printed on a strip 10 of photographic paper. The strip may be opaque and the markers transparent.

A cover 41 is provided for the device, attached to flanges 42, 43 on the walls 2, 3 by screws 44. The cover has a round opening 45 for the numbers 40 and an elongated slot 48 extending from the opening 45 to the front end of the strip 10. The width of the opening corresponds to the distance of the carriage movement from one tooth 23 to the other.

For testing the photographic paper for the correct exposure for a given photograph, the device is placed on the easel of a conventional photographic enlarger, and the carriage is raised to the limit by the movement of the slide 15. An image is then projected on the device, taking care that the lightest and darkest shades or portions of the picture appear together within the limits of the slot 48.

The time of the exposure for the first portion of the strip is made the shortest which may be expected to give good results. The slide 15 is then depressed and released, causing the carriage 5 to be moved one step to the next tooth 23 by the spring 11. The next exposure is then taken, allowing slightly longer time. This operation is continued, increasing the length of the exposure with each step, until the entire strip 10 is exposed and the carriage is stopped in its final position. As shown in the drawing by way of an example, the strip 10 is divided into 5 portions. The same portion of the image will be printed on each successive portion and, after developing, it will become apparent which time of exposure gave the best results. At the same time it will be also determined which exposure gives the best results for lightly shaded portions and which the darkest portions. If these two contrasting shades require different time of exposure, then it may be necessary to select some other grade of photographic paper, or to use an intermediate time of the exposure.

My device has important advantages in that the same portion of the picture is projected on all test portions of the paper strip; also that the dark and light portions of the image are tested and can be conveniently compared simultaneously.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A device for testing photographic exposure comprising an elongated flat base plate; side walls and an end wall extending from the base plate; a rod secured in the side walls near the end wall; a carriage plate slidably resting on the base plate; upstanding flanges at the inner end of the carriage plate slidably engaging the rod, the carriage plate being relatively narrow and adapted to be moved from one wall of the base plate to the other, the side edges of the carriage plate being formed as U-shaped guides for a strip of a photographic paper; a cover for the base plate having an elongated slot in the middle for exposing a narrow strip of the paper to the light; a spring supported at one end at the side wall of the base plate, the other end of the spring being secured to the carriage plate for urging the carriage plate toward the wall of the base plate; a stationary toothed rack mounted on the base plate near the end wall; a pawl pivotally supported on the carriage plate; means on the carriage plate for urging the pawl into engagement with the rack thereby holding the carriage plate against the pull of the spring; means to manually release the pawl for causing the carriage plate to move; and means on the pawl responsive to the movement of the carriage plate and independent of the manual means for rendering the manual means inoperative thereby causing the pawl to engage the next tooth and to stop the carriage plate.

2. A device for testing photographic exposure comprising an elongated flat base plate; side walls and an end wall extending from the base plate; a rod secured in the side walls near the end wall; a carriage plate slidably resting on the base plate; upstanding flanges at the inner end of the carriage plate slidably engaging the rod, the carriage plate being relatively narrow and adapted to be moved from one wall of the base plate to the other, the side edges of the carriage plate being formed as U-shaped guides for a strip of a photographic paper; a cover for the base plate having an elongated slot in the middle for exposing a narrow strip of the paper to the light; a spring supported at one end at the side wall of the base plate, the other end of the spring being secured to the carriage plate for urging the carriage plate toward the wall of the base plate; a stationary toothed rack mounted on the base plate near the end wall; a pawl pivotally supported on the carriage plate; means on the carriage plate urging the pawl into engagement with the rack for retaining the carriage plate against the pull of the spring; a lever pivotally supported on the pawl, yieldable means to hold the lever in an outward extending position; a bar with a dependable flange movably supported on the base plate and adapted to be manually operated for moving the lever thereby disengaging the pawl from the rack and releasing the carriage plate for movement under action of the spring, the end of the lever frictionally engaging the flange of the bar and being thereby deflected by the movement of the lever relative to the flange, thereby releasing the pawl for engagement with the next tooth of the rack and stopping the carriage plate.

3. A device for testing photographic exposure comprising an elongated flat base plate, side walls and an end wall extending from the base plate; a rod secured in the side walls near the end wall; a carriage plate slidably resting on the base plate; upstanding flanges at the inner end of the carriage plate slidably engaging the rod, the carriage plate being relatively narrow and adapted to be moved from one wall of the base plate to the other, the side edges of the carriage plate being formed as U-shaped guides for a strip of a photographic paper; a cover for the base plate having an elongated slot in the middle for exposing a narrow strip of the paper to the light; a spring supported at one end at the side wall of the base plate, the other end of the spring being secured to the carriage plate for urging the carriage plate toward the wall of the base plate; a stationary toothed rack mounted on the base plate near the end wall; a pawl pivotally supported on the carriage plate; means on the carriage plate urging the pawl into engagement with the rack for retaining the carriage plate against the pull of the spring; a lever pivotally supported on the pawl; yieldable means to hold the lever in an outward extending position; a second rod supported in the side walls and spaced from the first rod; a flange on the second rod; means to manually move the flange into engagement with the free end of the lever and to move the lever thereby moving the pawl away from the rack and releasing the carriage plate, the length of the pawl being so selected as to cause the pawl to be rotated by the engagement with the flange when the carriage plate is moved, thereby releasing the pawl for engagement with the next tooth of the rack and stopping the carriage plate.

4. A device for testing photographic exposure comprising an elongated flat base plate; side walls and an end wall extending from the base plate; a rod secured in the side walls near the end wall; a carriage plate slidably resting on the base plate; upstanding flanges at the inner end of the carriage plate slidably engaging the rod, the carriage plate being relatively narrow and adapted to be moved from one wall of the base plate to the other, side edges of the carriage plate being formed as U-shaped guides for a strip of a photographic paper; a cover for the base plate having an elongated slot in the middle for exposing a narrow strip of the paper to the light; a spring supported at one end at the side wall of the base plate, the other end of the spring being secured to the carriage plate for urging the carriage plate toward the wall of the base plate; a stationary toothed rack mounted on the base plate near the end wall; a pawl pivotally supported on the carriage plate; means on the carriage plate urging the pawl into engagement with the rack for retaining the carriage plate against the pull of the spring; a lever pivotally supported on the pawl; yieldable means to hold the lever in an outward extending position; a second rod rotatively supported in the side walls and spaced from the first rod; a depending flange on the second rod adapted to engage the free end of the lever; yieldable means to rotate the second rod for moving the flange away from the lever; a manually operable slide on the second rod; cooperating means on the slide and on the carriage plate for moving the carriage plate into its extreme outward position against the tension of the spring, the slide being further adapted to be manually depressed for causing the flange to engage and to move the lever thereby moving the pawl out of engagement with the rack, the lever being constructed and arranged to be rotated by the frictional engagement with the flange when the carriage plate is moved, thereby releasing the pawl for engagement with the next tooth of the rack and stopping the carriage plate.

5. A device for testing photographic exposure comprising an elongated flat base plate; side walls and an end wall extending from the base plate; a rod secured in the side walls near the end wall; a carriage plate slidably resting on the base plate; upstanding flanges at the inner end of the carriage plate slidably engaging the rod, the carriage plate being relatively narrow and adapted to be moved from one wall of the base plate to the other, the side edges of the carriage plate being formed as U-shaped guides for a strip of a photographic paper; the rear end of the carriage plate extending beyond the rear open end of the base plate; a strip of a transparent material secured at the ends to the U-shaped guides near the exposed end of the carriage plate, the strip being adapted to retain the end portion of the paper in engagement with the carriage plate and having dark numerals thereon to be printed by the action of light on the photographic paper; a cover for the base plate having a narrow elongated slot in the middle extending parallel to the edges of the carriage plate; a spring urging the carriage plate toward one side wall; a stationary rack on the base plate; a pawl on the carriage plate engaging the teeth of the rack; manually operable means to move the carriage plate against the tension of the spring; manually operable means for releasing the pawl thereby releasing the carriage plate for movement under action of the spring; and means on the pawl to render the pawl releasing means inoperative thereby causing the pawl to reengage the rack at its next tooth, the spacing of the teeth being equal to the spacing of the numerals on the strip.

ANDREW J. LOCKREY.
MORRIS DICHTER.

REFERENCES CITED

The following references are of record in the file of this patent:

UNITED STATES PATENTS

| Number | Name | Date |
| --- | --- | --- |
| 1,901,186 | Norworth | Mar. 14, 1933 |
| 2,026,907 | Morrison | Jan. 7, 1936 |
| 2,212,834 | Kalish | Aug. 27, 1940 |
| 2,219,703 | Spencer | Oct. 29, 1940 |
| 2,260,561 | Cuendet | Oct. 28, 1941 |
| 2,268,436 | Ash, Jr. | Dec. 20, 1941 |